US006312170B1

(12) United States Patent
Agano

(10) Patent No.: US 6,312,170 B1
(45) Date of Patent: Nov. 6, 2001

(54) HEAT DEVELOPING APPARATUS

(75) Inventor: Toshitaka Agano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/537,675

(22) Filed: Mar. 29, 2000

(30) Foreign Application Priority Data

Mar. 31, 1999 (JP) ........................ 11-093594

(51) Int. Cl.[7] ........................ G03B 13/00
(52) U.S. Cl. ........................ 396/575; 219/216
(58) Field of Search ........................ 396/575, 578; 219/216; 355/27–29, 400–405; 430/203

(56) References Cited

U.S. PATENT DOCUMENTS 5,869,806 * 2/1999 Strubble et al. ........................ 219/216
5,922,529 * 7/1999 Tsuzuki et al. ........................ 430/619

FOREIGN PATENT DOCUMENTS 0 080 376 A2 6/1983 (EP) .
10-62899 3/1998 (JP) .
10-186572 7/1998 (JP) .

* cited by examiner

*Primary Examiner*—D Rutledge
(74) *Attorney, Agent, or Firm*—Sughrue, Mion, Zinn, Macpeak & Seas, PLLC

(57) ABSTRACT

A heat developing apparatus having a structure such that a heat developing photosensitive material on which a latent image has been formed, by exposure to a corresponding image, is developed by performing heating. An inhibitor for inhibiting development when a heat development temperature has been raised is contained in the heat developing photosensitive material, and the heat developing photosensitive material is developed with heat at a temperature satisfying $|\Delta D/\Delta T| \leqq 0.15$ when an assumption is made that $\Delta D$ is an amount of change in the density and $\Delta T$ is an amount of change in the heat development temperature.

19 Claims, 3 Drawing Sheets

HEAT DEVELOPING APPARATUS

BACKGROUND OF THE INVENTION

1. Field of the Invention

The present invention relates to a heat developing apparatus for heating and development of a dry type photosensitive material on which a latent image has been formed owing to exposure, and more particularly to a heat developing apparatus arranged to use a heat developing photosensitive material which contains an inhibitor for inhibiting development.

2. Description of the Related Art

Hitherto, a medical image recording apparatus for use in a digital radiography system, a CT or an MR has been adapted to a wet system with which an image is photographed or recorded on a silver-salt photosensitive material. Then, a wet process is performed to obtain an image. On the other hand, in recent years a dry system heat developing apparatus has attracted attention which does not perform the wet process.

The foregoing heat developing apparatus is arranged to use a heat developing photosensitive material. The heat developing apparatus is arranged to form a latent image on the heat developing photosensitive material by performing exposure corresponding to the image. Then, a heat developing portion of the heat developing apparatus heats and develops the heat developing photosensitive material. Then, the heat developing photosensitive material having the formed image is discharged to the outside of the heat developing apparatus.

The foregoing dry system heat developing apparatus is able to form an image in a time shorter than time required for the wet process. Moreover, the problem of the waste solution process experienced with the wet process can be overcome. Therefore, a need for the heat developing apparatus is expected to be increased.

The density of the heat developing photosensitive material realized during the heat development which is performed by the conventional dry system heat developing apparatus is raised as the heat development temperature is raised and the heat development time is elongated. Therefore, to realize a stable density, the heat development temperature and a period of time in which development is substantially started and the same is completed (substantial heat development time) must precisely be controlled. The substantial heat development time varies owing to an influence of irregularity of the temperature occurring when the temperature of the heat developing photosensitive material is raised or irregularity of the temperature occurring when a cooling process is performed. To meet the above-mentioned requirements and eliminate the influence, it might be considered feasible to employ a structure of the apparatus incorporating a heating means which is a stable heat storage member having a large size.

However, if the heat developing apparatus incorporates the foregoing heat storage member, the overall size of the apparatus cannot be reduced. What is worse, the cost of the apparatus is enlarged excessively. If the precise control of the heat development temperature and the heat development time is not performed, a stable density cannot be realized. Thus, there arises a problem in that irregularity of an image occurs.

In view of the foregoing, an object of the present invention is to provide a heat developing apparatus which is capable of realizing a stable density without a necessity of precisely controlling the heat development temperature and the heat development time so as to prevent image irregularity without enlargement of the size and the cost of the apparatus.

SUMMARY OF THE INVENTION

To achieve the foregoing object, according to an aspect of the present invention, there is provided a heat developing apparatus comprising a structure having a heat developing photosensitive material on which a latent image has been formed owing to exposure corresponding to an image that is developed by performing heating, wherein an inhibitor for inhibiting development when the heat development temperature has been raised is contained in the heat developing photosensitive material, and the heat developing photosensitive material is developed with heat at a temperature satisfying $|\Delta D/\Delta T| \leqq 0.15$ when an assumption is made that $\Delta D$ is an amount of change in the density and $\Delta T$ is an amount of change in the heat development temperature.

The foregoing heat developing apparatus has a structure such that the inhibitor for preventing development as the heat development temperature is raised is contained in the heat developing photosensitive material. When the development time is constant, $|\Delta D/\Delta T|$ is made to be smaller than a predetermined (0.15) at a temperature not lower than a certain development temperature as the temperature is raised. Since the heat developing photosensitive material is developed with heat in the above-mentioned temperature range, a stable density can be obtained without a necessity of precisely controlling the development temperature.

According to another aspect of the present invention, there is provided a heat developing apparatus comprising a structure such that a heat developing photosensitive material on which a latent image has been formed owing to exposure corresponding to an image, is developed by performing heating, wherein inhibitor for inhibiting development when the heat development temperature has been raised is contained in the heat developing photosensitive material, and the heat developing photosensitive material is developed with heat at a temperature satisfying $|\Delta D/\Delta T| \leqq 0.1$ when an assumption is made that $\Delta D$ is an amount of change in the density and $\Delta T$ is an amount of change in the heat development temperature.

The foregoing heat developing apparatus has a structure such that the inhibitor for preventing development as the heat development temperature is raised is contained in the heat developing photosensitive material. When the development time is constant, $|\Delta D/\Delta T|$ is made to be smaller than a predetermined (0.1) at a temperature not lower than a certain development temperature as the temperature is raised. Since the heat developing photosensitive material is developed with heat in the above-mentioned temperature range, a stable density can be obtained without a necessity of precisely controlling the development temperature.

According to another aspect of the present invention, there is provided a heat developing apparatus comprising a structure such that a heat developing photosensitive material on which a latent image has been formed owing to exposure corresponding to an image, is developed by performing heating, wherein inhibitor for inhibiting development when the heat development temperature has been raised is contained in the heat developing photosensitive material, and the heat developing photosensitive material is developed with heat at a temperature satisfying $|\Delta D/\Delta T|=0$ when an assumption is made that $\Delta D$ is an amount of change in the density and $\Delta T$ is an amount of change in the heat development temperature.

The foregoing heat developing apparatus has a structure such that the inhibitor for preventing development as the heat development temperature is raised, is contained in the heat developing photosensitive material. When the development time is constant, $|\Delta D/\Delta T|$ is made to be zero at a temperature not lower than a certain development temperature as the temperature is raised. Since the heat developing photosensitive material is developed with heat in the above-mentioned temperature range, a stable density can be obtained without a necessity of precisely controlling the development temperature.

According to another aspect of the present invention, there is provided a heat developing apparatus comprising a structure such that a heat developing photosensitive material on which a latent image has been formed owing to exposure corresponding to an image, is developed by performing heating, wherein inhibitor for inhibiting development when the heat development temperature has been raised is contained in the heat developing photosensitive material, and the heat developing photosensitive material is developed in a period of time with which $|\Delta D/\Delta t| \leqq 0.1$ is satisfied when an assumption is made that $\Delta D$ is an amount of change in the density and $\Delta t$ is an amount of change in time.

The foregoing heat developing apparatus has a structure such that the inhibitor for preventing development as the heat development temperature is raised, is contained in the heat developing photosensitive material. When the development temperature is constant, $|D/\Delta t|$ is made to be smaller than a predetermined (0.1) when the development time is longer than a predetermined period of time as the time is elongated. Since the heat developing photosensitive material is developed with heat in the above-mentioned development time range, a stable density can be obtained without a necessity of precisely controlling the development temperature.

According to another aspect of the present invention, there is provided a heat developing apparatus comprising a structure that a heat developing photosensitive material on which a latent image has been formed owing to exposure corresponding to an image is developed by performing heating, wherein inhibitor for inhibiting development when the heat development temperature has been raised is contained in the heat developing photosensitive material, and the heat developing photosensitive material is developed in a period of time with which $|\Delta D/\Delta t| \leqq 0.07$ is satisfied when an assumption is made that $\Delta D$ is an amount of change in the density and $\Delta t$ is an amount of change in time.

The foregoing heat developing apparatus has a structure such that the inhibitor for preventing development as the heat development temperature is raised is contained in the heat developing photosensitive material. When the development temperature is constant, $|\Delta D/\Delta t|$ is made to be smaller than a predetermined (0.07) when the development time is longer than a predetermined period of time as the time is elongated. Since the heat developing photosensitive material is developed with heat in the above-mentioned development time range, a stable density can be obtained without a necessity of precisely controlling the development temperature.

According to another aspect of the present invention, there is provided a heat developing apparatus comprising a structure such that a heat developing photosensitive material on which a latent image has been formed owing to exposure corresponding to an image, is developed by performing heating, wherein inhibitor for inhibiting development when the heat development temperature has been raised is contained in the heat developing photosensitive material, and the heat developing photosensitive material is developed in a period of time with which $|\Delta D/\Delta t|=0$ is satisfied when an assumption is made that $\Delta D$ is an amount of change in the density and $\Delta t$ is an amount of change in time.

The foregoing heat developing apparatus has a structure such that the inhibitor for preventing development as the heat development temperature is raised is contained in the heat developing photosensitive material. When the development temperature is constant, $|\Delta D/\Delta t|$ is made to be zero when the development time is longer than a predetermined period of time as the time is elongated. Since the heat developing photosensitive material is developed with heat in the above-mentioned development time range, a stable density can be obtained without a necessity of precisely controlling the development temperature.

Other objects, features and advantages of the invention will be evident from the following detailed description of the preferred embodiments described in conjunction with the attached drawings.

DESCRIPTION OF THE PREFERRED EMBODIMENTS

Figure 1:
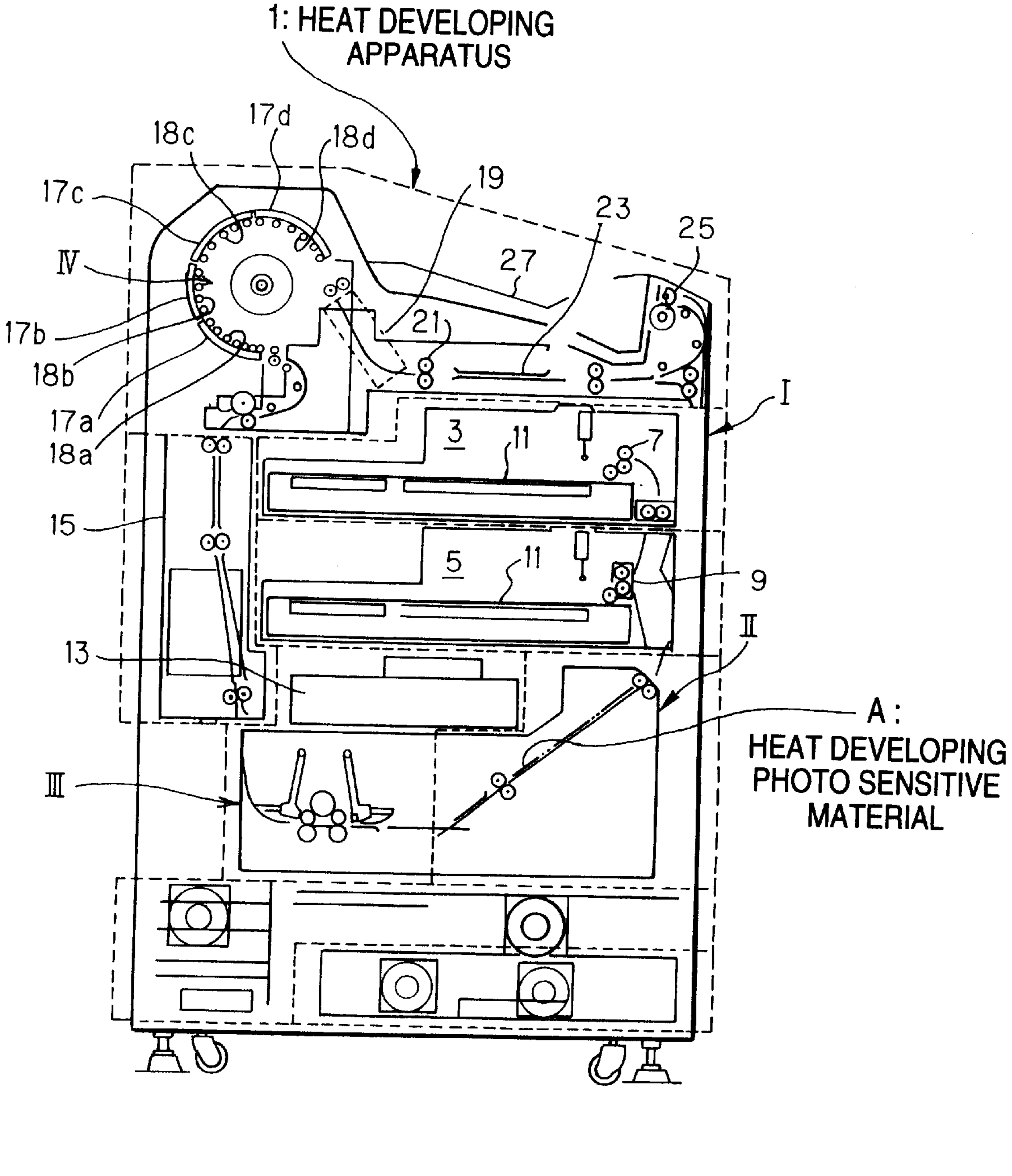
FIG. 1 is a schematic view showing the structure of an embodiment of a heat developing apparatus according to the present invention.

An embodiment of a heat developing apparatus according to the present invention will now be described with reference to the drawings. FIG. 1 is a schematic view showing the structure of an embodiment of the heat developing apparatus according to the present invention.

A heat developing apparatus 1 according to this embodiment incorporates a sensitive-material supply portion I, a sensitive-material locating portion II, an image exposing portion III and a heat processing unit IV sequentially disposed in a direction in which a heat developing apparatus (a heat development film arranged to be exposed with a laser beam) 1 is conveyed.

The sensitive-material supply portion I is a portion for, one by one, extracting the heat developing photosensitive material A to supply the same to the sensitive-material locating portion II disposed downstream in the direction in which the heat developing photosensitive material A is conveyed. The sensitive-material supply portion I incorporates feeding portions 3 and 5, supply roller pairs 7 and 9 disposed in the feeding portions, a conveying roller pair and conveying guides (not shown).

The feeding portions 3 and 5 are portions on which magazines 11 accommodating the heat developing photosensitive material A are loaded at predetermined positions. In the example shown in the drawing, the two feeding portions 3 and 5 are provided. The heat developing photosensitive materials A having different sizes, for example, a center folded film size for CT or MRI or B4-size for FCR (Fujitsu Computed Radiograph), are loaded into the magazines 11. Each of the feeding portions 3 and 5 is provided with a sensitive-member supply means (not shown). The sensitive-member supply means incorporates a suction cup which adsorbs and holds the heat developing photosensitive material A. When the suction cup is moved by a known moving means, such as a link mechanism, the heat developing photosensitive material A is conveyed so as to be supplied to the supply roller pairs 7 and 9 provided for the corresponding feeding portions 3 and 5.

The heat developing photosensitive material A is a material on which an image is recorded (exposed) with at least one light beam, such as a laser beam. Then, heat development is performed to develop colors. The heat developing photosensitive material A contains an inhibitor for inhibiting development.

The heat developing photosensitive material A is formed into a sheet shape. Then, the heat developing photosensitive material A is formed into a laminate (a bundle) in a predetermined unit which is usually 100 sheets. The laminate is wrapped by a bag or a band so as to be formed into a package.

The heat developing photosensitive material A will be described later.

The heat developing photosensitive material A supplied from the feeding portion 3 or 5 to the supply roller pair 7 or 9 is conveyed to the downstream sensitive-material locating portion II by the conveying roller pair while being guided by the conveying guides. The sensitive-material locating portion II align the heat developing photosensitive material A in a direction (the widthwise direction) perpendicular to the conveying direction so as to align the position of the heat developing photosensitive material A in the main scanning direction in the downstream image exposing portion III.

The image exposing portion III is a portion for exposing the heat developing photosensitive material A to correspond to an image by performing scanning and exposure with a laser beam. The image exposing portion III incorporates an optical unit 13 and a sub-scanning conveying means.

The optical unit 13 is a known light beam scanning unit for deflecting a light beam modulated in accordance with an image which must be recorded into the main scanning direction (the widthwise direction of the heat developing photosensitive material A) so as to make the laser beam incident on a predetermined recording position. Moreover, the optical unit 13 is provided with a variety of elements which are provided for a known laser beam scanning unit, if necessary, the elements include a collimator lens, a beam expander, optical correction system for correcting a facet-deviation, an optical path adjusting mirror and so forth. The laser beam, the width of which has been modulated in accordance with the image which must be recorded, is deflected into the main scanning direction. Therefore, the heat developing photosensitive material A is two-dimensionally scanned and exposed so that a latent image is recorded.

The present invention is structured such that a light source is directly modulated to perform pulse width modulation. The heat developing apparatus according to the present invention may be adapted to an apparatus which perform modulation of the number of pulses. If the apparatus performs the pulse modulation, the heat developing apparatus according to the present invention may be adapted to an apparatus which performs indirect modulation by using an external modulator, such as an AOM (Acoustic-optical modulator). Moreover, an image may be recorded by performing analog intensity modulation.

The heat developing photosensitive material A on which the latent image has been formed in the image exposing portion III is conveyed to the heat processing unit IV through a transferring portion 15. The heat processing unit IV incorporates four-sectioned plate heaters 17*a*, 17*b*, 17*c* and 17*d*. The plate heaters 17*a*, 17*b*, 17*c* and 17*d* and roller groups 18*a*, 18*b*, 18*c* and 18*d* are disposed to form a sequential circular-arc configuration.

Specifically, the heat processing unit IV has a structure such that the plate heaters 17*a*, 17*b*, 17*c* and 17*d* form a concave surface. Moreover, the roller groups 18*a*, 1*ab*, 18*c* and 18*d* are disposed along the concave surface. The roller groups 18*a*, 18*b*, 18*c* and 18*d* move (slide) the heat developing photosensitive material A for transmitting heat while the heat developing photosensitive material A is made to contact with the concave surface. As a result, the heat developing photosensitive material A is moved such that the leading end of the heat developing photosensitive material A which must be conveyed is pressed against the plate heaters 17*a*, 17*b*, 17*c* and 17*d*. Therefore, buckling of the heat developing photosensitive material A can be prevented.

A cooling portion 19 is disposed at a downstream position 25 of the heat processing unit IV. The heat developing photosensitive material A discharged from the heat processing unit IV is allowed to pass through the cooling portion 19 so that the temperature of the heat developing photosensitive material A is lowered to a level not higher than the heat development start temperature. Then, the heat developing photosensitive material A is guided to a guide plate 23 by a conveying roller pair 21 so as to be collected into a tray 27 from a discharge roller pair 25.

The heat developing photosensitive material A which is usually used in a heat development process must be developed with heat such that the heat developing photosensitive material A is maintained at a temperature of 110° C. to 130° C. for 10 seconds to 30 seconds. Therefore, uniformity of the densities in the plane of one heat developing photosensitive material and uniformity (constant of the densities among heat developing photosensitive materials when a high-speed sequential process is performed) must be maintained under the foregoing conditions.

The characteristic of change in the temperature of the heat developing photosensitive material as time elapses will now be described.

Figure 2:
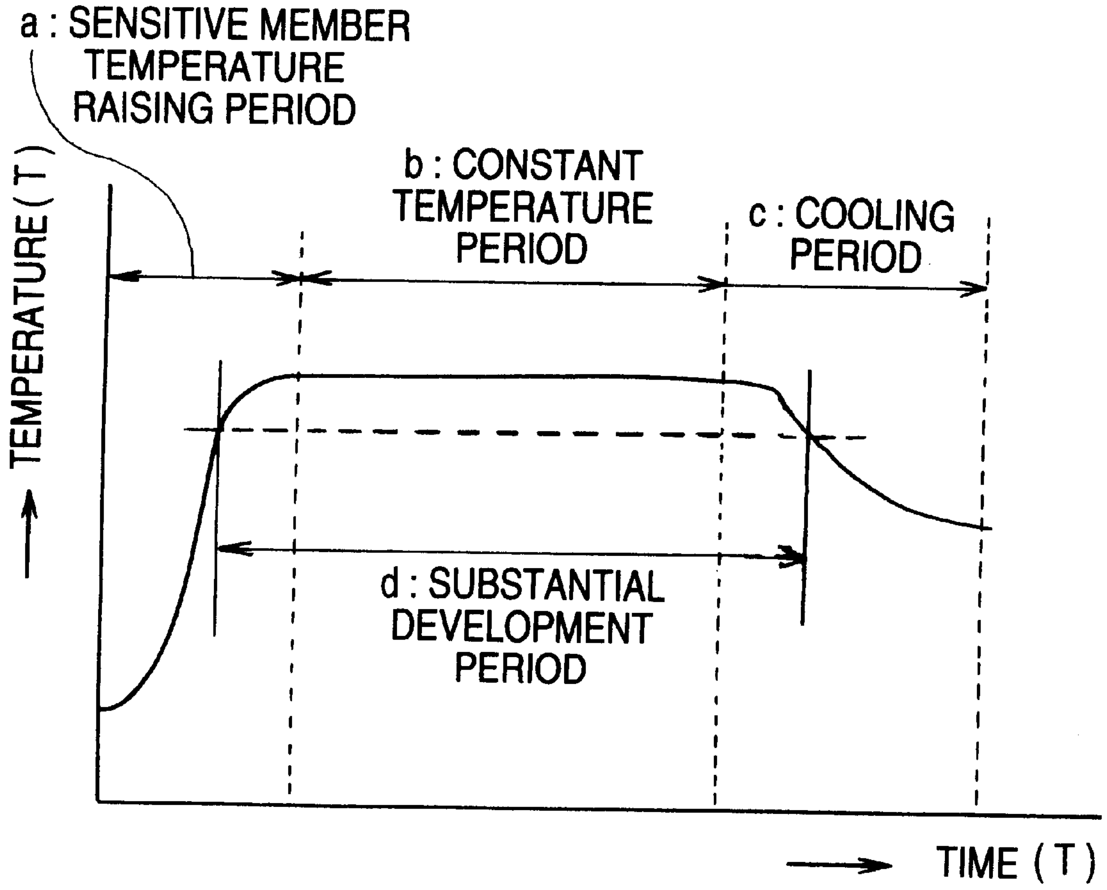
FIG. 2 is a graph showing the characteristic of change in the temperature of a representative heat developing photosensitive material occurring as time elapses during the heat development process.

FIG. 2 shows the representative characteristic of change in the temperature of the heat developing photosensitive material occurring during a heat development process as the time elapses. Referring to FIG. 2, region a indicates a period in which the temperature is raised, region b indicates a period in which the temperature is constant, region c indicates a cooling period and region d indicates a substantial heat development period. As can be understood from FIG. 2, heat development starts also before completion of the period an in which the temperature of the heat developing photosensitive material is raised. After the cooling period c has been started, the heat development is completed after a lapse of a short time.

Dependency of the heat developing photosensitive material on the temperature during the heat development and dependency of the same on the time will now be described.

Figure 3:
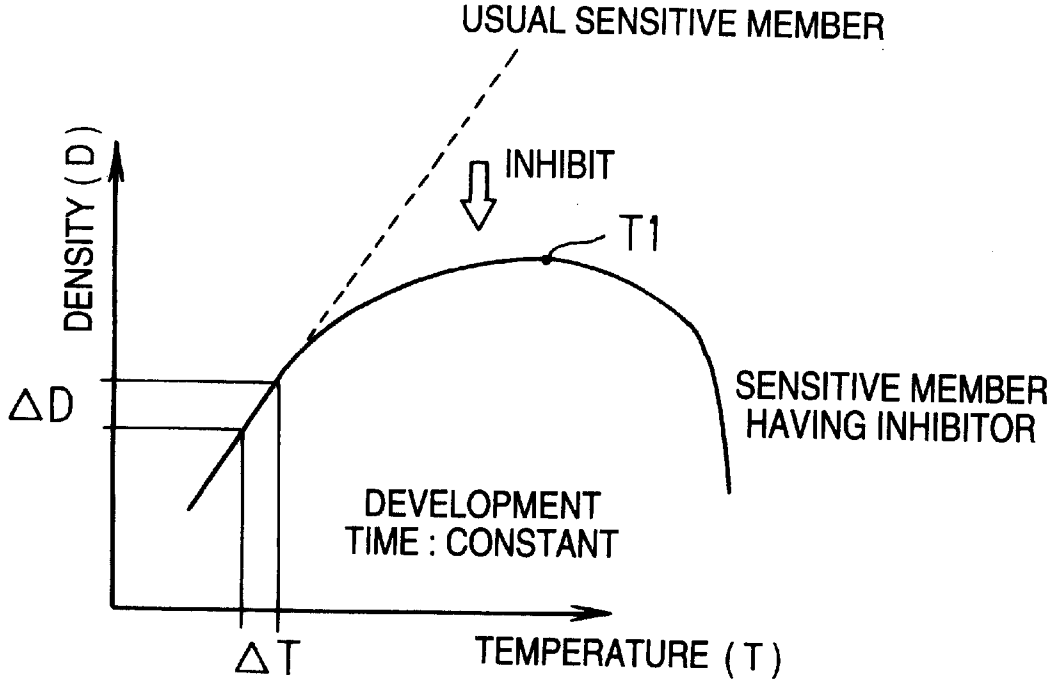
FIG. 3 is a graph showing dependency of the heat developing photosensitive material on the heat development temperature.
Figure 4:
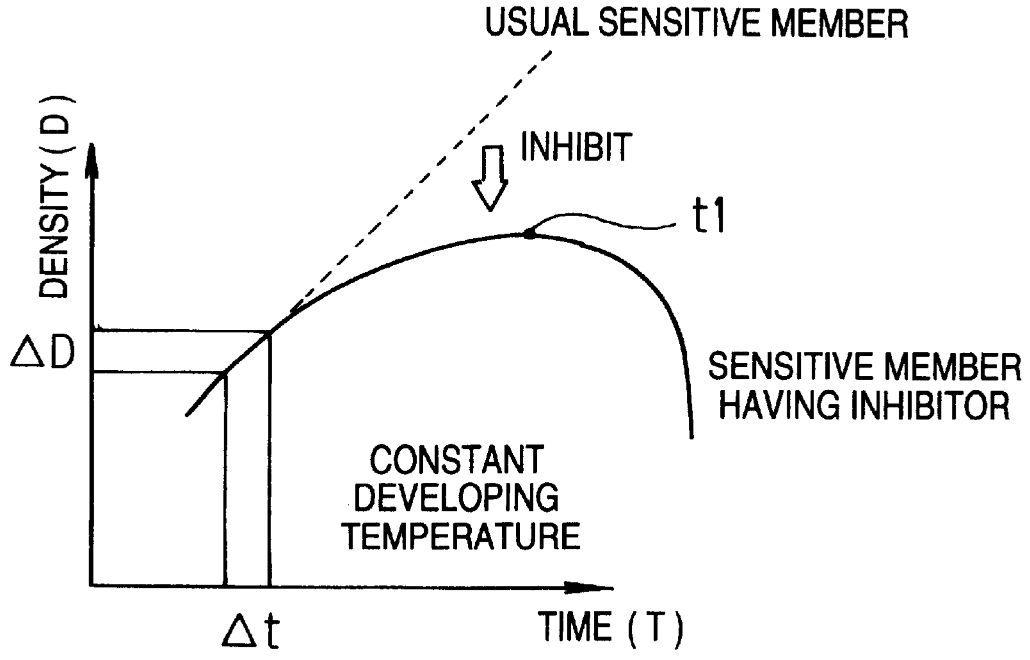
FIG. 4 is a graph showing dependency of the heat developing photosensitive material on the heat development time.

FIG. 3 is a graph showing dependency of the heat developing photosensitive material on the heat development temperature. FIG. 4 is a graph showing dependency of the heat developing photosensitive material on the heat development time. The development density D of a usual heat developing photosensitive material has a characteristic which is greatly and linearly changed as indicated with dashed lines shown FIGS. 3 and 4 if the heat development temperature T or the heat development time t is changed. Therefore, if the heat development temperature T or the heat development time t is changed in the substantial heat development period d, great change in the density occurs.

The heat developing photosensitive material A for use in the heat developing apparatus 1 according to this embodiment contains the inhibitor which inhibits development as the heat development temperature T is raised or the heat development time t is elongated (that is, the development proceeds). Therefore, a characteristic with which change in the density can be reduced in a certain region can be imparted to the heat developing photosensitive material A. The heat developing apparatus 1 according to this embodiment is characterized in that the heat developing photosensitive material A is used in the foregoing region in which change in the density is restrained.

FIGS. 3 and 4 show characteristic lines (dashed lines) of a usual heat developing photosensitive material and characteristic curves of the heat developing photosensitive material A with respect to the heat development temperature T and the heat development time t. The change in the density of the heat developing photosensitive material A with respect to the heat development temperature T and the heat development time t can be expressed with $\Delta D/\Delta T$ and $\Delta D/\Delta t$ when $\Delta D$ indicates the amount of change in the density, $\Delta T$ indicates an amount of change in the temperature and $\Delta t$ indicates amount of change in the time. The region in which the change in the density of the heat developing photosensitive material A is restrained is a region in which the absolute value of $\Delta D/\Delta T$ and $\Delta D/\Delta t$ is small. That is, the foregoing region is a region in which the differentiated value of each characteristic curve is zero or the same is close to zero.

The heat developing photosensitive material A containing the above-mentioned inhibitor has a characteristic with which $\Delta D/\Delta T$ can be reduced as the temperature is raised at a temperature not lower than a certain temperature if the development time is constant. Moreover, a characteristic with which $\Delta D/\Delta T$ can be made to be zero (T1 shown in FIG. 3) can be imparted.

As shown in FIG. 4, when the temperature is constant, $\Delta D/\Delta t$ can be reduced as the time is elongated at a development time longer than a certain period of time. Moreover, a characteristic with which $\Delta D/\Delta t$ can be made to be zero (t1 shown in FIG. 4) can be imparted.

Therefore, when the heat developing photosensitive material A is developed with heat at a temperature or time close to a temperature or time with which $\Delta D/\Delta T$ or $\Delta D/\Delta t$ is reduced (ideally made to be zero), a stable density can be realized without a necessity of performing precise control of the development temperature and the development time. In particular, when $\Delta D/\Delta T$ or $\Delta D/\Delta t$ is made to be zero, development does not proceed to a density not lower than a predetermined density. Therefore, the development process can be performed stably.

Preferred ranges of the $\Delta D/\Delta T$ with respect to change in the temperature and $\Delta D/\Delta t$ with respect to change in the time will now be described.

That is, if change in the overall surface of the heat developing photosensitive material does not occur, an upper limit of the change in the temperature is about $\Delta D=\pm0.15$. At present, temperature accuracy which can be realized by the heat developing apparatus 1 is $\Delta t\pm1°$ C. Therefore, the range must be $(\pm0.15/\pm1)$ 0.15 or smaller which is obtained by dividing the foregoing values. That is, it is preferable that the heat developing photosensitive material A is developed with heat at a temperature with which $|\Delta D/\Delta T|\leqq0.15$. It is furthermore preferable that $\Delta D=\pm0.1$ or smaller. In the foregoing case, the condition is $(\pm0.1/\pm1)$ 0.1 or smaller. Thus, the heat developing photosensitive material A is developed with heat at a temperature with which $|\Delta D/\Delta T|\leqq0.1$ is realized.

The reason why the $\Delta D/\Delta T$ is an absolute value lies in that also the portion of the characteristic curve downwards inclined toward the right is included. Moreover, it is preferable that the heat developing photosensitive material A is developed with heat at a temperature at which $|\Delta D/\Delta T|=0$ is realized.

On the other hand, change in the time causes a vertical line irregularity of the heat developing photosensitive material A to appear. An allowable value for the foregoing irregularity is a severe value $\Delta D=\pm0.01$. At present, the heat developing apparatus 1 is able to realize a time accuracy of ±0.1 second. Therefore, the condition is a value smaller than $(\pm0.01/\pm0.1)$ 0.1 obtained by dividing the foregoing values. That is, it is preferable that the heat developing photosensitive material A is developed with heat in a development time with which $|\Delta D/\Delta t|\leqq0.1$ is realized. It is furthermore preferable that $\Delta D$ ±0.007 or smaller. In the foregoing case, the condition is the value $(\pm0.007/\pm0.1)$ 0.07 or smaller obtained by dividing the foregoing values. Thus, the heat developing photosensitive material A is developed with heat in a development time with which $|\Delta D/\Delta t|\leqq0.07$ is realized.

The reason why $\Delta D/\Delta t$ is the absolute value lies in the same as the foregoing case. It is furthermore preferable that the heat developing photosensitive material A is developed with heat in the development time with which $|\Delta D/\Delta t|=0$ is realized.

Specifically, the heat developing photosensitive material A contains inhibitors, such as a mercapto compound, disulfide compound and a thionic acid compound, in order to inhibit and control development, improve the spectral sensitization effect or improve preservation characteristic after the development has been performed. The mercapto compound, the disulfide compound and the thionic acid compound have been disclosed in paragraph numbers 0067 to 0069 of Japanese Patent Laid-Open No. 10-62899, compounds expressed by general formula (I) and its specific examples in paragraph numbers 0033 to 0052 of Japanese Patent Laid-Open No. 10-186572 and line 36 to line 56 on page 20 of EP. Laid-Open No. 0803764A1. The following materials may be employed: mercapto-substitution complex aromatic compound, 2-mercaptobenzimidazole, 2-mercapto-5-methylbenzimidazole, 2-mercaptobenzothiazole, 2-mercaptobenzoxazole, 2-mercapto-5-methylbenzimidazole, 6-ethoxy-2-mercaptobenzoxazole, 2,2'-dithiobis(benzothiazole, 3-mercapto-1,2,4-triazole, 4,5-diphenyl-2-imidazolethiol, 2-mercaptoimidazole, 1-ethyl-2-mercaptobenzimidazole, 2-mercaptoquinoline, 8-mercaptopurine, 2-mercapto-4 (3H)-quizolinone, 7-trifluoromethyl-4-quinolinethiol, 2,3,5, 6-tetrachloro-4-pyridinethiol, 4-amino-6-hydroxy-2-mercaptopyrimidine monohydrate, 2-amino-5-mercapto-1, 3,4-thiaxiazole, 3-amino-5-mercapto-1,2,4-triazole, 4-hydroxy-2-mercaptopyrimidine, 2-mercaptopyrimidine, 4,6-diamino-2-mercaptopyrimidine, 2-mercapto-4-methylpyrimidinehydrochloride. More preferably, 3-mercapto-5-phenyl-1,2,4-triazole, 2-mercapto-4-phenyloxazole or 3-mercapto-4-phenyl5-heptyl-1,2,4-triazole is employed. It is preferable that the amount of the foregoing mercapto compound which must be added satisfies a range from 0.001 mol to 1.0 mol per one mole of silver in the emulsion layer, more preferably 0.01 mol to 0.3 mol per one mole of silver.

As described above, according to the heat developing apparatus 1, the usual heat developing photosensitive material which is linearly changed (the dashed lines shown in FIGS. 3 and 4) with respect to change in the heat development temperature and the heat development time contains the inhibitor. Thus, a required characteristic is imparted to the heat developing photosensitive material A to be capable of inhibiting and controlling development. Moreover, the heat developing photosensitive material A is used in a portion in which the inclination of the characteristic curve is moderate, that is, in a range in which an influence of the change in the heat development temperature and the heat development time is not easily exerted. Therefore, a stable density can be realized without a necessity of precise control of the development temperature and the development time.

As described above, the heat developing apparatus according to the present invention has the structure that the heat developing photosensitive material contains the inhibitor which inhibits development as the rise of the heat development temperature. The heat developing photosensitive material is used in a range in which an influence of the change in the heat development temperature and the heat development time is not easily exerted. Therefore, a stable density can be realized without a necessity of precisely controlling the development temperature and the development time. As a result, irregularity of the density of the image can be prevented without a necessity of enlarging the size and the cost of the apparatus.

What is claimed is:

1. A heat developing apparatus comprising:

a heat processing unit for producing a heat development temperature; and a heat developing photosensitive material on which a latent image has been formed, said heat developing photosensitive material having an inhibitor for inhibiting development corresponding to a change in the heat development temperature, so that said heat developing photosensitive material is developed such that $|\Delta D/\Delta T| \leqq 0.15$ when an assumption is made that ΔD is an amount of change in a density of the heat developing photosensitive material and ΔT is the amount of change in the heat development temperature.

2. A heat developing apparatus according to claim 1, wherein the apparatus is constituted such that the heat developing photosensitive material is maintained at a temperature of 110° C. to 130° C. for 10 seconds to 30 seconds.

3. A heat developing apparatus according to claim 1, wherein said inhibitor includes an amount of a mercapto compound in a range from 0.001 mol to 1.0 mol per one mole of silver in an emulsion layer of said heat developing photosensitive material.

4. A heat developing apparatus comprising:

a heat processing unit for producing a heat development temperature; and a heat developing photosensitive material on which a latent image has been formed, said heat developing photosensitive material having an inhibitor for inhibiting development corresponding to a change in the heat development temperature, so that said heat developing photosensitive material is developed such that $|D/\Delta T| \leqq 0.1$ when an assumption is made that ΔD is an amount of change in a density of the heat developing photosensitive material and ΔT is the amount of change in the heat development temperature.

5. A heat developing apparatus according to claim 4, wherein the apparatus is constituted such that the heat developing photosensitive material is maintained at a temperature of 110° C. to 130° C. for 10 seconds to 30 seconds.

6. A heat developing apparatus according to claim 4, wherein said inhibitor includes an amount of a mercapto compound in a range from 0.001 mol to 1.0 mol per one mole of silver in an emulsion layer of said heat developing photosensitive material.

7. A heat developing apparatus comprising:

a heat processing unit for producing a heat development temperature; and a heat developing photosensitive material on which a latent image has been formed, said heat developing photosensitive material having an inhibitor for inhibiting development corresponding to a change in the heat development temperature, so that said heat developing photosensitive material is developed such that $|\Delta D/\Delta T| = 0$ when an assumption is made that ΔD is an amount of change in a density of the heat developing photosensitive material and ΔT is the amount of change in the heat development temperature.

8. A heat developing apparatus according to claim 7, wherein the apparatus is constituted such that the heat developing photosensitive material is maintained at a temperature of 110° C. to 130° C. for 10 seconds to 30 seconds.

9. A heat developing apparatus according to claim 7, wherein said inhibitor includes an amount of a mercapto compound in a range from 0.001 mol to 1.0 mol per one mole of silver in an emulsion layer of said heat developing photosensitive material.

10. A heat developing apparatus comprising:

a heat processing unit for producing a heat development temperature; and a heat developing photosensitive material on which a latent image has been formed, said heat developing photosensitive material having an inhibitor for inhibiting development corresponding to a change in the heat development temperature, so that said heat developing photosensitive material is developed such that $|\Delta D/\Delta t| \leqq 0.1$ is satisfied when an assumption is made that ΔD is an amount of change in a density of the heat developing photosensitive material and Δt is an amount of change in heat development time.

11. A heat developing apparatus according to claim 10, wherein the apparatus is constituted such that the heat developing photosensitive material is maintained at a temperature of 110° C. to 130° C. for 10 seconds to 30 seconds.

12. A heat developing apparatus according to claim 10, wherein said inhibitor includes an amount of a mercapto compound in a range from 0.001 mol to 1.0 mol per one mole of silver in an emulsion layer of said heat developing photosensitive material.

13. A heat developing apparatus comprising:

a heat processing unit for producing a heat development temperature; and a heat developing photosensitive material on which a latent image has been formed, said heat developing photosensitive material having an inhibitor for inhibiting development corresponding to a change in the heat development temperature, so that said heat developing photosensitive material is developed such that $|D/\Delta T| \leqq 0.07$ is satisfied when an assumption is made that ΔD is an amount of change in a density of the heat developing photosensitive material and Δt is an amount of change in heat development time.

14. A heat developing apparatus according to claim 13, wherein the apparatus is constituted such that the heat developing photosensitive material is maintained at a temperature of 110° C. to 130° C. for 10 seconds to 30 seconds.

15. A heat developing apparatus according to claim 13, wherein said inhibitor includes an amount of a mercapto compound in a range from 0.001 mol to 1.0 mol per one mole of silver in an emulsion layer of said heat developing photosensitive material.

16. A heat developing apparatus comprising:

a heat processing unit for producing a heat development temperature; and a heat developing photosensitive material on which a latent image has been formed, said heat developing photosensitive material having an inhibitor for inhibiting development corresponding to a change in the heat development temperature, so that said heat developing photosensitive material is developed such that $|\Delta D/\Delta t| \leqq 0$ is satisfied when an assumption is made that $\Delta D$ is an amount of change in a density of the heat developing photosensitive material and $\Delta t$ is an amount of change in heat development time.

17. A heat developing apparatus according to claim 16, wherein the apparatus is constituted such that the heat developing photosensitive material is maintained at a temperature of 110° C. to 130° C. for 10 seconds to 30 seconds.

18. A heat developing apparatus according to claim 16, wherein said inhibitor includes an amount of a mercapto compound in a range from 0.001 mol to 1.0 mol per one mole of silver in an emulsion layer of said heat developing photosensitive material.

19. A heat developing apparatus according to claim 16, wherein said inhibitor includes an amount of a mercapto compound in a range from 0.01 mol to 0.3 mol per one mole of silver in an emulsion layer of said heat developing photosensitive material.

* * * * *